Dec. 26, 1939.    W. H. HINSCH    2,184,346
WATER TREATMENT APPARATUS
Filed April 8, 1937    2 Sheets-Sheet 1

Witness:
E. Camporini

Inventor:
Walter H. Hinsch,
By: Arthur W. Nelson
Attorney.

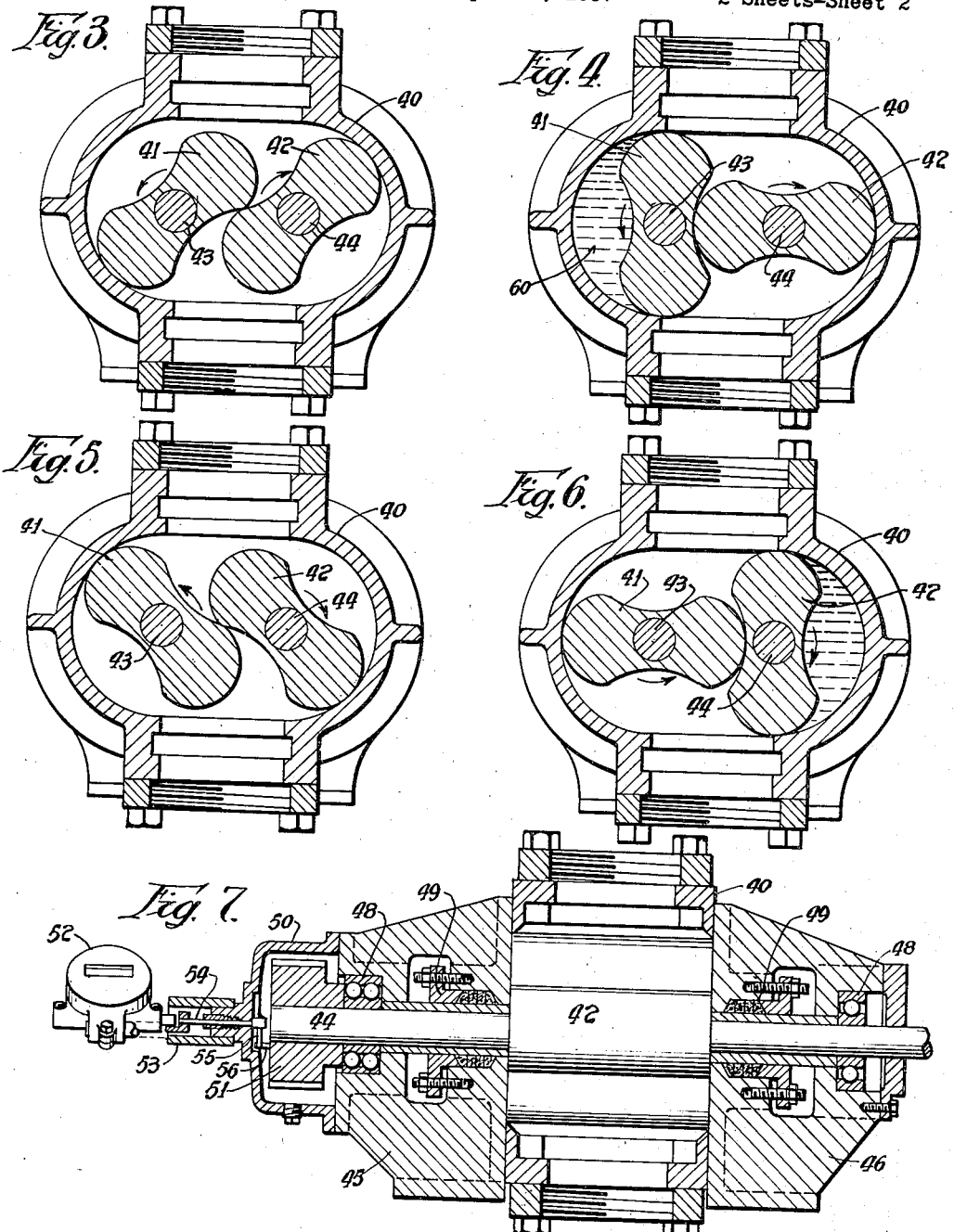

Patented Dec. 26, 1939

2,184,346

UNITED STATES PATENT OFFICE 2,184,346

WATER TREATMENT APPARATUS

Walter H. Hinsch, Chicago, Ill., assignor to Dearborn Chemical Company, Chicago, Ill., a corporation of Illinois Application April 8, 1937, Serial No. 135,669

3 Claims. (Cl. 210—40)

This invention relates to improvements in water treatment apparatus and it consists of the matters hereinafter described and more particularly pointed out in the appended claims.

The present apparatus is herein illustrated and described as especially adapted for treating boiler water to bring about a rapid and more complete precipitation of scale forming salts and to cause the resulting suspended matter to be of such form as to be readily removed as a sludge. In one form of apparatus for this purpose, the water to be treated flows through a conduit under a predetermined pressure and a reagent liquid is fed proportionately into the water being treated to produce the desired result. This reagent liquid is usually drawn from a supply tank by means of a suitable pump and the pump may be driven either by an electric motor or by a water motor actuated by the flowing water being treated.

Heretofore, water motors for this purpose involved certain springs, valves, buckets, wheels, liners and other parts upon which certain precipitation from the water would accumulate and build up to such an extent as not only to impair their operation and efficiency with an appreciable back pressure or drop, but would also affect the feed pump to destroy its proportioning functions.

Frequently water supplies are encountered carrying foreign material such as vegetable matter, gravel, sand or silt. Such material cannot pass through the conventional water wheel or valved water motor and, therefore, accumulates therein to choke and stop the same. This, of course, not only reduces motor operation efficiency, but it changes the proportion of the reagent to the water being treated. Therefore, servicing is necessary, which calls for a shut down of the apparatus and this is most apt to occur when the apparatus is most needed.

One of the objects of the present invention is to provide a water treatment apparatus which includes a particular kind of water motor for driving the reagent feed pump, thereby to eliminate certain objections inherent in apparatus of this kind heretofore used.

Another object of the invention is to provide in an apparatus of this kind, a water motor for driving the reagent pump and which motor is devoid of parts giving trouble, such as springs, valves, buckets, wheels, liners and the like, is instantly responsive to any variation in rate of flow of the water being treated and will operate at a speed in direct proportion to the volume of water put through the same.

A further object of the invention is to provide an apparatus of this kind embodying a water motor which will readily pass through it, without injury, the relatively large particles of foreign material carried by the water, and which will also function to keep its operating surfaces free from matter precipitated from the water.

The above mentioned objects of the invention, as well as others, together with the several advantages thereof, will more fully appear as the specification proceeds.

In the drawings:

Fig. 3 is a transverse vertical sectional view through the water motor embodied in the apparatus for driving the chemical or reagent pump.

Figs. 4, 5 and 6 are views similar to Fig. 3 showing changed position of the motor impellers.

Fig. 7 is a longitudinal vertical sectional view on an enlarged scale through the motor shown in Fig. 3 and which will be more fully referred to later.

Figure 2:
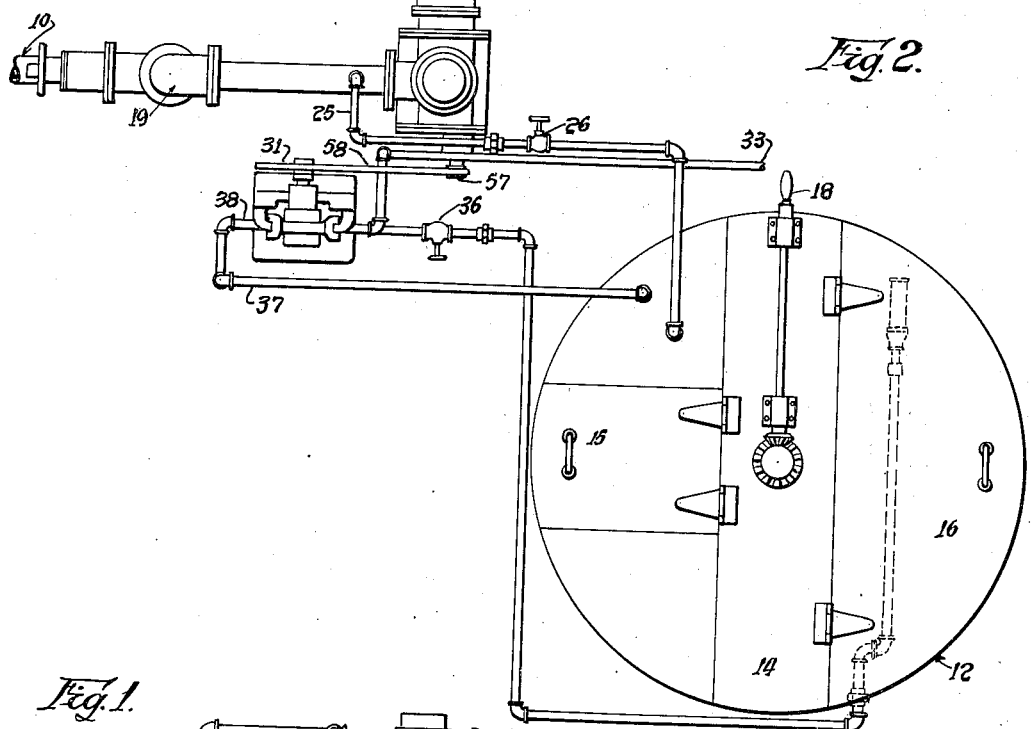
Fig. 2 is a top plan view of the same.
Figure 1:
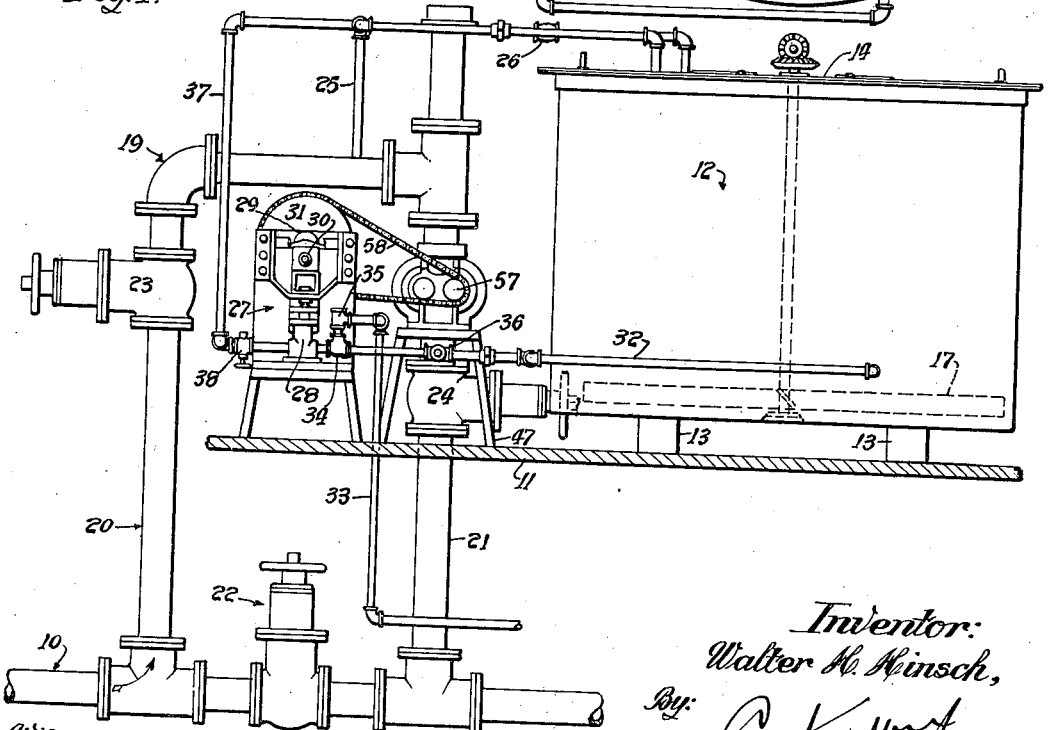
Fig. 1 is a view in side elevation of a water treatment apparatus embodying the preferred form of the invention.

Referring now in detail to that embodiment of the invention illustrated in the drawings, 10 indicates a main or conduit through which the water to be treated, flows under pressure in the direction of the arrows. Above said main or conduit is a floor or platform 11 for supporting those parts of the apparatus used for treating the water that flows through said main. 12 indicates a tank for containing a fluid chemical reagent with which the water is to be treated. This tank, which rests upon stringers 13 on the floor 11 has a closed top 14 with certain hinged doors or lids 15 and 16 whereby the level of the reagent and the internal conditions of the tank may be ascertained. In said tank, near the bottom is a paddle 17 operable by means of a crank 18 and whereby the reagent may be periodically agitated.

19 indicates a by-pass conduit having inlet and outlet legs 20—21 connected to the main 10. A shut-off valve 22 is disposed in said main between said by-pass legs. Shut-off valves 23—24 are disposed in the by-pass legs 20 and 21 respectively. It is apparent that by proper manipulation of the valves, the water may be caused to flow through the by-pass or to flow directly through the main, as may be desired. To provide water for mixing with the reagent material in the tank 12, a branch 25 leads off from a suitable point in the by-pass 19 to discharge through the top 14 of the tank. A valve 26 is provided in said branch for controlling the passage of water therethrough.

27 indicates a pump arranged on the floor 11 forwardly of the by-pass conduit and substantially in a plane between the planes of the legs of the by-pass. Preferably the pump is of the kind shown in United States Letters Patent 2,030,296 granted to Frederick B. Horstmann on February 11, 1936, and therefore it is neither illustrated nor described in detail herein. Generally, said pump includes a cylinder 28 in which a plunger reciprocates from the upper end thereof. Said plunger is operatively connected to a crank arm 29 on a shaft 30 and on this shaft is a member 31 whereby power may be transmitted to the pump for driving the same. As shown herein, said member 31 is a sprocket wheel. 32 indicates a pipe connecting a bottom portion of the tank 12 with the inlet end of the pump cylinder 28 and 33 indicates a chemical or reagent liquid discharge line which is connected at one end to the pipe 32 by means of opposed check valves 34 and 35 respectively. The other end of said pipe 33 opens into the main 10. A shut off valve 36 is provided in the line 32. A pipe 37 connects the pump cylinder 28 with the top of the tank 12 and a pressure relief valve 38 is provided in the line 37. In the suction stroke of the pump, a quantity of reagent liquid is drawn from the tank 12 and in the discharge stroke of the pump, said quantity of liquid is forced through the line 33 into the stream of water in the main 10. Should an obstruction occur in the line 33, the valve 38 opens so that the reagent liquid is merely circulated from the tank 12 through the line 32, pump 27 and line 37 back into the tank. In this manner the pump cannot be injured by an overload, should the reagent line become clogged.

Heretofore in apparatus of this kind, the pump was driven either by an electric motor controlled by a flow switch associated with the main 10 or by a water motor deriving its power from the stream of water being treated. The water motors heretofore used for this purpose were of the kind that usually included springs, valves, buckets, wheels or liners or the like. Such motors are far from satisfactory for several reasons. The matter precipitated from the water being treated tends to accumulate on said parts not only to impair their efficiency, but through the pump, to change the proportion of the reagent with respect to the volume of water being treated. Also, the water being treated often carries foreign material such as vegetable matter, gravel, sand and silt. Such material seriously impairs the operation of the parts in such motors and often causes breakage of said parts so as to make servicing and repair necessary. This also entails a shut down of the apparatus and which may occur when it is most needed.

To provide a motor which is subject to none of the disadvantages before mentioned and is highly efficient and which can be operated over a long period of years without noticeable depreciation in efficiency and with a low maintenance cost, I provide a motor of the following construction and of a type termed a "cycloidal" motor.

In the outlet leg 21 of the by-pass 19 above the floor 11, I provide a casing 40 in which are arranged two specially shaped impellers 41—42 that rotate in opposite directions. These impellers are mounted on shafts 43—44 and the opposed sides of the casing are made as arcs of circles struck from the axis of each shaft. The open ends of the casing are closed by heads 45 and 46 respectively and these heads include bottom foot-like flanges for engagement upon and attachment to a support or stand 47 resting on the floor. Each head is provided with suitable antifriction bearings 48 for the shafts 43—44 and between each end of the associated impeller and bearings is a packing gland 49.

A cover or cap 50 is secured to the head 45 to enclose both shaft ends and a pair of meshing gears 51 thereon whereby the impellers are synchronized. Only one of said gears appears in Fig. 7. If desired, a revolution counter or register 52 may be employed in connection with the motor. Such a register is supported on a bracket 53 carried by the cover or cap. The register is driven by a shaft 54 journalled in the cover or cap, axially with one of the shafts 43—44 and said shaft 54 is provided with an arm 55 for engagement by an actuator stem 56 carried by the gear on the associated shaft.

One of the shafts 43—44 is provided at that end opposite the cover plate with a sprocket wheel 57 that is connected by a chain 58 with the sprocket wheel 31 before mentioned on the shaft 30 of the pump 27.

In the operation of the motor, water under the pressure, which causes it to flow through the conduit 10, enters the top of the motor casing 40. With the parts in the position shown in Fig. 3, the velocity of the water causes the impellers 41 and 42 to rotate in opposite directions as indicated by the arrows. After both impellers have turned through a certain angle, they will have reached the position shown in Fig. 4. It will be noted from Fig. 4 that there is a space 60 at the left of the impeller 41 that is filled with water and is entirely cut off from both the inlet and the outlet side of the pump casing. The water in this space 60 is carried around by the impeller 41 to the outlet side of the motor for discharge back into the by-pass.

As the impellers continue to rotate, they reach the position shown in Fig. 6. It is now apparent that the spaces above the impellers 41—42 are similar and, therefore a volume equal to space 60 must have been emptied into the outlet of the associated by-pass leg. The total volume of water put through the motor for every revolution therefore, amounts to four times the volume of the space 60. As the motor is responsive to the flow of water through the main and as the pump is responsive to the speed of the motor, it is apparent that the amount of reagent fed to the water is accurately proportioned thereto. Thus, if the pressure in the main 10 drops causing a slower flow of water therethrough, a lesser amount of reagent is fed to the water. Conversely, if the pressure in the main increases causing a more rapid flow of water therethrough, a greater amount of reagent, but still in proportion to the amonut of water flowing through the main, is fed thereinto.

A motor of this kind is a positive displacement machine and water offered to it will pass through it at a definite amount per revolution of the impellers with but a slight reduction in velocity. Such a motor is instantly responsive to any variation in rate of flow and the impellers rotate at a speed in direct proportion to the volume of water passing through the motor. When used for driving a chemical or reagent feeder or pump as described herein, an accurate and dependable proportion of said reagent is furnished at any rate of water flow.

The motor includes no springs, valves, buckets or wheels common to water motors heretofore used for the same purpose. The active surfaces of the impellers and the associated walls of the casing are kept absolutely clean so that no water precipitation can impair the efficiency and operation of the motor. Another feature which makes the motor of especial advantage in its use herein is its ability to permit relatively large solids such as pebbles, sand and vegetable matter, deleterious to other forms of water motors, to pass freely therethrough without damage or breakage or without scoring the active surfaces of the casing and impellers. Such a motor is capable of delivering power far in excess of that required to drive the pump and this power is obtained from the water pressure exerted against the unbalanced projected areas of the impellers.

Such a pump incorporated in a water treatment apparatus makes the same more dependable and efficient in operation, better in flow responsiveness so as to assure accurate proportioning between the water being treated and the reagent used and has a greater flexibility over a much wider range of conditions than has heretofore been possible in water motors as heretofore used for this purpose.

While in describing the invention, I have referred in detail to the form, arrangement and construction of the various parts of the apparatus, the same is to be considered only in the illustrative sense so that I do not wish to be limited thereto except as may be specifically set forth in the appended claims.

I claim as my invention:

1. A water treatment apparatus embodying therein means providing a conduit for a flowing stream of water, means providing a supply of fluid reagent, power driven means adapted to transfer measured quantities of said reagent from said supply into said stream, and a cycloidal motor positioned in said stream and operable in response to the flow of said stream through said conduit for driving said power driven means.

2. A water treatment apparatus embodying therein means providing a conduit for a flowing stream of water, means providing a by-pass conduit for said stream having inlet and outlet legs connected to the first mentioned conduit, means for controlling the passage of water through said first mentioned conduit and through said by-pass conduit respectively, power driven means adapted to deliver measured quantities of a fluid reagent from a source of supply into said stream, a cycloidal motor casing having an inlet and an outlet operatively connected in one of said legs of said by-pass conduit and formed with an impeller chamber, a pair of shafts journalled in said casing, cooperating impellers secured to said shafts within the casing, and means connecting one of said shafts of said motor with said power driven means for driving the latter.

3. A water treatment apparatus embodying therein means providing a conduit for a flowing stream of water, means providing a by-pass conduit for said stream having an inlet and an outlet connected to the first mentioned conduit, means for controlling the passage of water through said first mentioned conduit and through said by-pass conduit respectively, power driven means adapted to deliver measured quantities of a fluid reagent into said stream, a motor casing having an inlet and an outlet operatively connected in said by-pass conduit and formed with a chamber therein, a pair of relatively rotatable members in said chamber, a shaft operatively secured to one of said members in said chambers and having a portion arranged outside said casing, and means connecting said shaft portion with the said power driven means for driving the same.

WALTER H. HINSCH.